F. T. HAGUE.
DAMPING DEVICE FOR DYNAMO ELECTRIC MACHINES.
APPLICATION FILED DEC. 29, 1915.
1,298,695.
Patented Apr. 1, 1919.
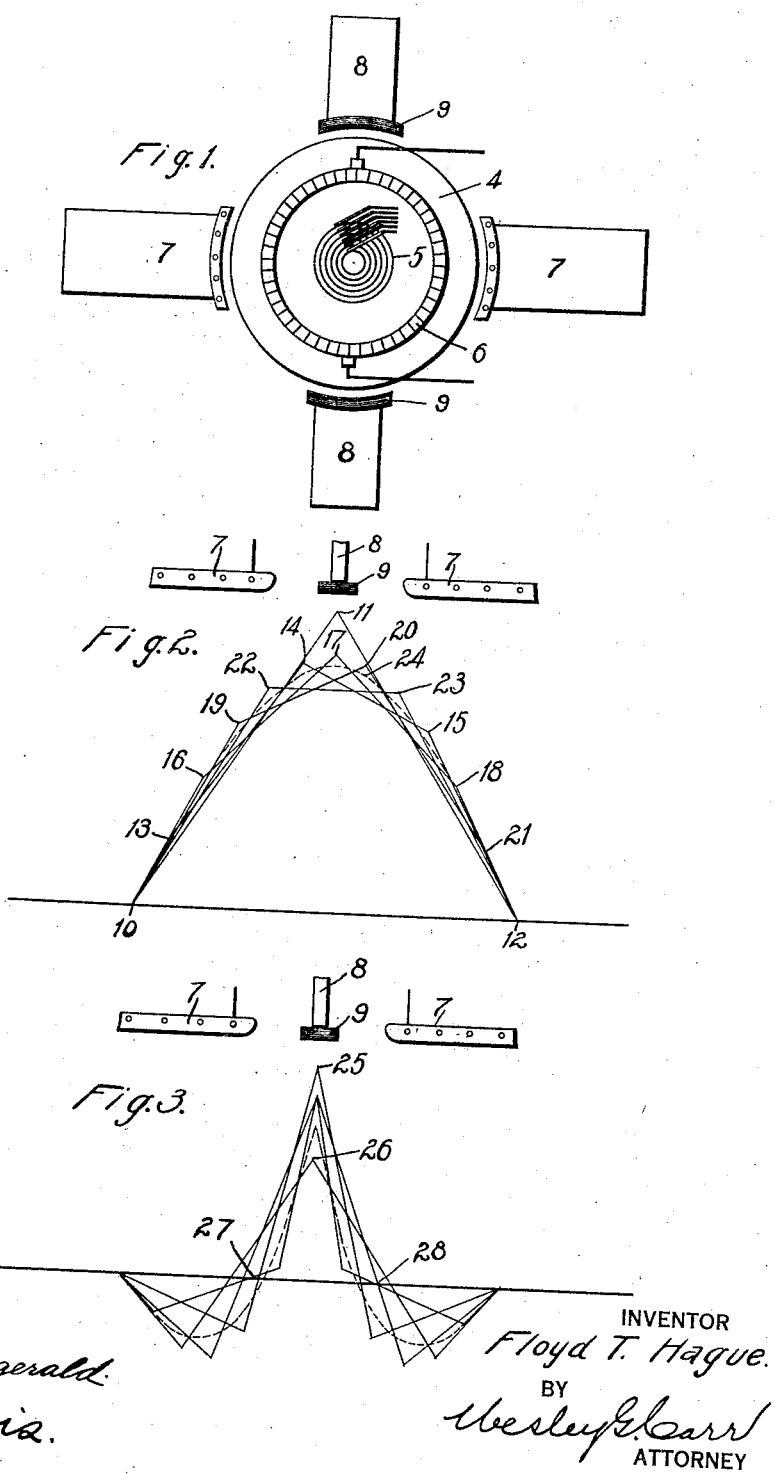
WITNESSES:
R. J. Fitzgerald
D. C. Davis
INVENTOR
Floyd T. Hague.
BY
Wesley G. Carr
ATTORNEY

UNITED STATES PATENT OFFICE.

FLOYD T. HAGUE, OF PITTSBURGH, PENNSYLVANIA, ASSIGNOR TO WESTINGHOUSE ELECTRIC AND MANUFACTURING COMPANY, A CORPORATION OF PENNSYLVANIA.

DAMPING DEVICE FOR DYNAMO-ELECTRIC MACHINES.

1,298,695. Specification of Letters Patent. Patented Apr. 1, 1919.

Application filed December 29, 1915. Serial No. 69,255.

*To all whom it may concern:*

Be it known that I, FLOYD T. HAGUE, a citizen of the United States, and a resident of Pittsburgh, in the county of Allegheny and State of Pennsylvania, have invented a new and useful Improvement in Damping Devices for Dynamo-Electric Machines, of which the following is a specification.

My invention relates to damping apparatus for dynamo-electric machines, being particularly directed to damping apparatus to be employed in connection with interpoles on rotary converters, and it has for its object to provide apparatus of the character described that will effectually damp out fluctuations in the armature flux under interpoles with a minimum amount of heating and other disturbance of the normal operation of the machine.

In the accompanying drawing, Figure 1 is a diagrammatic view of a rotary converter, in side elevation, illustrating the preferred form of my invention; Fig. 2 is a diagram illustrating the direct-current and alternating-current magnetomotive forces under the interpole of the rotary converter of Fig. 1 with different tap-coil displacements; and Fig. 3 is a diagram illustrating the net or resultant pulsating magnetomotive force with different tap-coil displacements.

In the operation of rotary converters, the direct-current or generator reaction tends to neutralize the alternating-current or motor reaction but, when integrated around the entire armature, the motor reaction necessarily preponderates because of the energy dissipated in friction, windage and iron losses. The armature reaction under the brushes, however, is essentially a generator reaction because, in the commutating zone, the direct-current reaction preponderates over the alternating-current reaction. Said resultant generator reaction is not constant, however, because, while the gross generator reaction is a constant, the gross alternating-current reaction fluctuates or pulsates with the passage of tap coils through the commutating zone, thus causing pulsations in the resultant reaction. Said pulsations in the flux to be neutralized by the interpole winding prevent perfect neutralization or uniform over-compensation, as is desirable, with consequent defective commutation, all as pointed out in an article entitled "Interpoles in synchronous converters" by B. G. Lamme and F. D. Newbury appearing on pages 1625 *et. seq.* of volume 29 of the *Proceedings of the American Institute of Electrical Engineers.*

Mounting a damping coil around the tip of an interpole does not smooth out the pulsations in the net armature flux for a reason to be hereinafter fully pointed out, but I find that, by covering the entire face of an interpole with a mass of conducting material, such, for example, as copper or a suitable alloy, said net armature reaction may be so smoothed out that effective compensation or over-compensation therefor may be provided, with resultant good commutation.

In order to minimize the heat produced by eddy currents circulating in planes other than those normal to the radial armature flux, I may laminate said conducting mass in a direction normal to the armature flux, thus confining all eddy currents produced to their most effective planes of action.

Referring to the accompanying drawing for a more detailed understanding of my invention, I show the armature of a six-phase rotary converter at 4 in Fig. 1. The armature 4 is provided with slip rings 5 for the alternating-current input and with a commutator 6 for the direct-current output and is furthermore embraced by a suitable stator member provided with exciting pole pieces 7—7 and with interpoles 8—8, all as is well known and understood in the art. The entire faces of the interpoles 8—8 are covered by damping devices 9—9, each of which comprises either a single conducting body or a mass of superposed conducting plates insulated from each other, either wholly or in part, as for example, by the interposition of thin layers of oxid, varnish or fibrous material therebetween.

Having thus described the structure of a rotary converter embodying my invention, the operation is as follows: Referring to Fig. 2, wherein two exciting pole pieces 7—7 and an interpole 8 are shown in developed position, the direct-current armature reaction from one exciting pole center to the next is shown by a line 10—11—12. Said armature reaction is obviously a maximum under the brushes, which are under the interpole, and has a zero value under the centers of the exciting poles. The alternating-current reaction for a six-phase converter with a tap coil having a displacement of 15° from the center of the left hand exciting pole is shown by a broken line 10—13—14—15—12; for a 30° displacement, by a line 10—16—17—18—12; for a 45° displacement, by a line 10—19—20—21—12; and for a 60° displacement by a line 10—22—23—12.

For subsequent like spaced displacements of the tap coil, the alternating-current reactions may be represented by duplications of the above-mentioned lines and the average alternating-current reaction is shown by a dotted line 10—24—12. The alternating-current reaction has a maximum value at the point 17 of substantially 85% of the direct-current reaction and attains a minimum value represented by the line 22—23 of substantially 73.5% of the direct-current reaction. The alternating-current reaction continuously pulsates between these limits at the frequency of some higher harmonic, and the value of the average alternating-current reaction is substantially 81% of the direct-current reaction.

The difference between the lines representing alternating-current reaction and the line representing direct-current reaction in Fig. 2 has been plotted in Fig. 3 to a larger scale and represents the net or effective armature reaction pulsating between a maximum direct-current value at the point 25 of substantially 26.5% of the direct-current reaction and a minimum direct-current value at the point 26 of substantially 15% of the direct-current reaction. In the neighborhood of the points 27 and 28, the effective armature reaction reverses in sign and, under the horns of the exciting poles, has a motor or alternating-current value. If a damping coil having its sides located in or near the exciting poles be placed about the interpole 8, said pulsations in the value of the effective flux directly under the interpole will be substantially unaffected thereby because the flux that cuts the first damper bar is the sum of all the fluxes from that bar to the center line between poles. It will be noticed that, while the flux wave form in this case changes shape materially, it is nevertheless true that the total flux may remain almost constant in value and, as a result, the above-mentioned damping coil being cut by said total flux which is very small or substantially zero in value, exercises but little damping effect.

By the application of a continuous mass of conducting material to the face of the interpole, however, an eddy-current path is provided at each and every point under the interpole and, therefore, changes in flux brought about by changes in the wave form of the armature flux, at whatever point, will be compensated for.

I find that a solid mass of copper may exercise more damping effect than is necessary to properly control the commutation and may lead to disturbance of the machine operation at times of sudden load change, preventing the interpolar magnetomotive force from closely following the armature magnetomotive force. I prefer, therefore, to use, as a damping material, a substance which has considerably higher specific resistance than copper, the specific resistance being so chosen that the desired damping effect may be obtained without undue disturbance of the machine operation.

In large machines, it is found that, with normal load, dampers of the type above indicated may become excessively heated. This heat is produced by eddy currents, some of which circulate in planes normal to the radial armature flux, and, consequently, are effective in damping and others of which circulate in other planes and are, consequently, more or less ineffective. By laminating the damping mass in a direction normal to the radial flux, said ineffective eddy currents are eliminated and, consequently, the heating of the damping device may be maintained within reasonable limits.

The theoretical optimum width for the damping member would be that of the commutating zone but substantially equivalent results, with a rather better mechanical construction, may be obtained by providing a damping member of substantially the width of the interpole. Furthermore, by the construction shown, slight movement of the commutating zone is permissible.

While I have shown my invention in its preferred form, it will be obvious to those skilled in the art that it is susceptible of various minor changes and modifications without departing from the spirit thereof and I desire, therefore, that only such limitations shall be placed thereupon as are imposed by the prior art or are specifically set forth in the appended claims.

I claim as my invention:

1. The combination with a dynamo-electric machine, of damping means associated therewith and comprising a plurality of superposed sheets of conducting material substantially covering a pole face thereof.

2. The combination with a dynamo-electric machine provided with cross-field poles, of damping means associated therewith and comprising a continuous body of conducting material substantially covering the face of one of said cross-field poles.

3. The combination with a dynamo-electric machine provided with cross-field poles, of damping means associated therewith comprising a plurality of superposed sheets of conducting material substantially covering the face of one of said cross field poles.

4. The combination with a rotary converter provided with cross-field poles, of damping means associated therewith and comprising a continuous body of conducting material substantially covering the face of one of said cross-field poles.

5. The combination with a rotary converter provided with cross-field poles, of damping means associated therewith comprising a plurality of superposed sheets of conducting material substantially covering the face of one of said cross field poles.

6. The combination with a rotary converter provided with commutating interpoles, of means for neutralizing the pulsating armature reaction flux at all points under said interpoles.

In testimony whereof, I have hereunto subscribed my name this 20th day of December, 1915.

FLOYD T. HAGUE.

Copies of this patent may be obtained for five cents each, by addressing the "Commissioner of Patents, Washington, D. C."